(No Model.)
J. S. JOHNSON.
DEVICE FOR PRESERVING PERISHABLE ARTICLES.
No. 595,174. Patented Dec. 7, 1897.
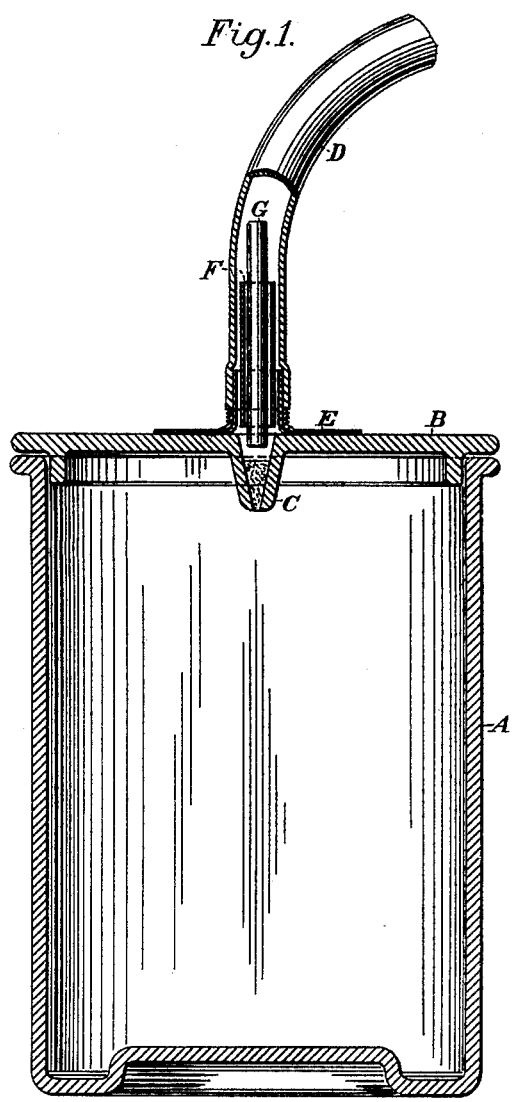
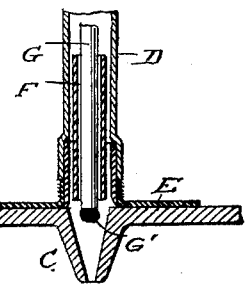
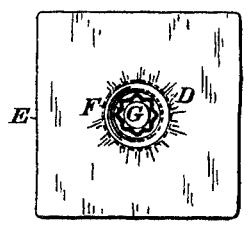
Witnesses,
Inventor,
Joseph S. Johnson

UNITED STATES PATENT OFFICE.

JOSEPH S. JOHNSON, OF SAN FRANCISCO, CALIFORNIA.

DEVICE FOR PRESERVING PERISHABLE ARTICLES.

SPECIFICATION forming part of Letters Patent No. 595,174, dated December 7, 1897.

Application filed December 14, 1896. Serial No. 615,621. (No model.)

*To all whom it may concern:*

Be it known that I, JOSEPH S. JOHNSON, a citizen of the United States, residing in the city and county of San Francisco, State of California, have invented an Improvement in Preserving Perishable Articles; and I hereby declare the following to be a full, clear, and exact description of the same.

My invention relates to a means for preserving perishable articles.

It consists in the parts and the construction and combination of parts hereinafter described and claimed.

Referring to the accompanying drawings, Figure 1 is a sectional view of my device applied to a containing vessel. Fig. 2 is a transverse section of the exhaust and supplemental tubes and plunger. Fig. 3 is a detail showing the inclosed plunger with the sealing or closing material upon its ends.

For the purpose of preserving fresh fruits, vegetables, and other perishable articles it is found desirable to keep them in a vacuum. My invention is especially designed to produce such a vacuum and provide a means for instantaneously and hermetically sealing the containing vessel after the vacuum has been produced. For this purpose the containing vessel A may be made of glass, metal, or any other suitable or desired material, and after being filled with the articles to be preserved the cover B may be applied and hermetically sealed. Through this cover is made an opening, and I have here shown it as provided with a cone C, decreasing in diameter from the exterior opening to the inner end, which has a very small hole sufficient to allow the air to be withdrawn from the vessel through the hole, but to leave the least possible surface for the pressure of exterior air after it has been sealed.

D is a tube which is adapted to be connected with any air-pump or means for exhausting the air. Around the end of the tube is fixed a flexible flap E, having one portion secured to the tube and a second or flanged portion of sufficient area to fit the cover around the exhaust-opening and the cone C, and this flap is of a material, such as rubber, that when the act of exhaustion commences this flap will be drawn down closely upon the surface of the cover around the exhaust-opening, fitting so tightly as to prevent any ingress of air.

Within the tube D is a second tube F, which is loosely fixed in the outer tube or in a sleeve fixed therein, and this tube contains a plunger G, the diameter of which is such that it may be introduced into the opening at the outer end of the cone of the conical exhaust-tube. Upon the end of this plunger is fixed the sealing or closing material G', and the plunger is then withdrawn into the tube, so as to be temporarily out of the way. The space around the plunger may be sufficient for the escape of air; but I prefer to make the inner tube F corrugated and sufficiently smaller than the outer exhaust-tube D to allow the air to pass freely around it, and when the exhaustion takes place the air will be drawn from the containing vessel and will pass freely up around the tube and plunger until the exhaustion is complete.

In order to make the vacuum as perfect as possible and to practically take all of the air out of the containing vessel, I place a few drops of any volatile liquid, such as alcohol, in the containing vessel with the fruit, and when the exhaustion commences this liquid will volatilize and take the place of the air, which may thus be entirely withdrawn from the chamber, leaving a very attenuated vapor within the vessel, which vapor is of such a character that it will not injuriously affect the contained substances.

As soon as the exhaustion has proceeded as far as it can practically be effected the plunger is moved downwardly in the tube, thus forcing the sealing material into the cone C and hermetically closing the opening, after which by allowing air to enter the suction-tube the pressure upon the flap will be removed, and the tube can be withdrawn.

In order to simplify the operation, I have made the outer suction-tube flexible and yielding, and as the end of the plunger extends up into this tube a short distance the plunger may be easily forced down into the cone C by simply pressing the sides of the flexible yielding tube, so as to force the plunger downward and seal the opening in the cone before the air-pressure is relieved. The cone may be afterward filled entirely full of sealing material and will thereafter retain a perfect vacuum.

Having thus described my invention, what I claim as new, and desire to secure by Letters Patent, is—

Means for exhausting air from containing vessels and thereafter sealing the same, consisting of the cover of the vessel having a conical projection on its inside, provided with a downwardly-contracting opening, a suction-pipe adapted to be connected with an exhaust apparatus at one end, a flap secured to the opposite end of the suction and having a flanged portion of flexible material adapted to circumscribe the opening in the cover and to be drawn down closely on said cover, and to be held thereto by the exhaustion to prevent the ingress of air, a tube loosely fixed in the suction-pipe and corrugated to form passages for the escape of air from the vessel and a plunger within the corrugated tube adapted to carry sealing material upon its end, said plunger being advanced to hermetically close the contracted opening after exhaustion is completed.

In witness whereof I have hereunto set my hand.

JOSEPH S. JOHNSON.

Witnesses:
S. H. NOURSE,
GEO. H. STRONG.